US010079492B2

(12) United States Patent
Rozman et al.

(10) Patent No.: US 10,079,492 B2
(45) Date of Patent: Sep. 18, 2018

(54) ELECTRIC POWER SYSTEM FOR A SPACE VEHICLE

(71) Applicant: Hamilton Sundstrand Corporation, Charlotte, NC (US)

(72) Inventors: Gregory I Rozman, Rockford, IL (US); Michael Anthony Futrell, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 402 days.

(21) Appl. No.: 15/348,413

(22) Filed: Nov. 10, 2016

(65) Prior Publication Data

US 2018/0131192 A1     May 10, 2018

(51) Int. Cl.
*B64G 1/44*     (2006.01)
*H02J 1/10*     (2006.01)
(Continued)

(52) U.S. Cl.
CPC .............. *H02J 3/385* (2013.01); *B64G 1/425* (2013.01); *B64G 1/428* (2013.01); *B64G 1/443* (2013.01); *G05F 1/10* (2013.01); *H02J 1/08* (2013.01); *H02J 1/102* (2013.01); *H02J 3/14* (2013.01); *H02J 3/36* (2013.01); *H02J 7/345* (2013.01);
(Continued)

(58) Field of Classification Search
CPC .... B64D 2221/00; B64G 1/425; B64G 1/428; B64G 1/443; G05F 1/10; G05F 1/67; H02J 1/08; H02J 1/102; H02J 3/383; H02J 3/385; H02J 7/34; H02J 7/345; H02J 7/35; H02J 9/061; Y02E 10/50; Y02E 10/56; Y02E 10/566; Y02E 10/58
See application file for complete search history.

(56) References Cited

U.S. PATENT DOCUMENTS 4,649,287 A    3/1987   Nola
5,228,644 A    7/1993   Garriott
(Continued)

FOREIGN PATENT DOCUMENTS

CN    102324583    1/2012
CN    103414235    11/2013
(Continued)

OTHER PUBLICATIONS

Rozman, et al., U.S. Appl. No. 15/443,627, filed Feb. 27, 2017 and entitled Power Management and Distribution Architecture for a Space Vehicle.
(Continued)

*Primary Examiner* — Levi Gannon
(74) *Attorney, Agent, or Firm* — Snell & Wilmer L.L.P.

(57) ABSTRACT

An electrical power system may comprise a first plurality of power sources, a first collector bus configured to receive power from the plurality of power sources, an unregulated DC bus configured to receive power from the first collector bus, a regulated high voltage direct current (HVDC) bus configured to receive power from the unregulated DC bus, and a first power distribution unit (PDU) configured to receive power from the regulated HVDC bus. The regulated HVDC bus may be configured to supply power to a high voltage load. The first plurality of power sources may comprise a first solar array, a first supercapacitor, and/or a first battery.

20 Claims, 11 Drawing Sheets

(51) Int. Cl.
*H02J 3/38* (2006.01)
*H02J 7/35* (2006.01)
*B64G 1/42* (2006.01)
*H02J 3/14* (2006.01)
*H02J 3/36* (2006.01)
*H02J 9/06* (2006.01)
*G05F 1/10* (2006.01)
*H02J 1/08* (2006.01)
*H02J 7/34* (2006.01)

(52) U.S. Cl.
CPC ............... *H02J 7/35* (2013.01); *H02J 9/061* (2013.01); *Y02E 10/58* (2013.01)

(56) References Cited

U.S. PATENT DOCUMENTS

| | | | |
|---|---|---|---|
| 5,311,419 | A | 5/1994 | Shires |
| 5,604,430 | A | 2/1997 | Decker |
| 5,892,299 | A * | 4/1999 | Siewert ............... H02J 9/061 307/38 |
| 6,049,190 | A | 4/2000 | Canter |
| 6,344,700 | B1 | 2/2002 | Eisenhauer |
| 7,150,938 | B2 | 12/2006 | Munshi |
| 7,852,049 | B2 | 12/2010 | Maddali |
| 8,022,661 | B1 | 9/2011 | Bauer |
| 8,550,405 | B2 | 10/2013 | Hruby |
| 8,789,791 | B2 | 7/2014 | Matasso |
| 9,276,401 | B2 | 3/2016 | Rozman |
| 2009/0310391 | A1 | 12/2009 | Becker-Irvin |
| 2011/0073714 | A1 | 3/2011 | Hruby |
| 2011/0299303 | A1* | 12/2011 | Lee ................ H02J 3/385 363/21.02 |
| 2012/0232728 | A1 | 9/2012 | Karimi |
| 2012/0326516 | A1* | 12/2012 | Gurunathan ............ H02J 1/00 307/72 |

FOREIGN PATENT DOCUMENTS

| | | |
|---|---|---|
| CN | 103414236 | 11/2013 |
| CN | 104300663 | 1/2015 |
| CN | 105429182 | 3/2016 |
| JP | H0530656 | 2/1993 |
| RU | 2476972 | 2/2013 |

OTHER PUBLICATIONS

Rozman, et al., U.S. Appl. No. 15/348,379, filed Nov. 10, 2016 and entitled Solar Powered Spacecraft Power System.
English translation of Russian Patent No. 2574911, issued on Feb. 10, 2016 and owned by Information Satellite Systems.
English translation of Russian Patent No. 2574475, issued on Feb. 10, 2016, assignee unknown.
Gao, et al., "Parallehl-Connected Solar PV System to Address Partial and Rapidly Fluctuating Shadow Conditions," IEEE Trans. On Industrial Electronics, vol. 56, No. 5, pp. 1548-1556, May 2009.
Thomas, et al., "DroopControl Method for Parallel DC Converters Used in Standalone PV-Wind Power Generating System," International Journal of Research in Engineering and Technology, vol. 4, Issue 10, Oct. 2015.
European Patent Office, European Search Report dated Mar. 14, 2018 in Application No. 17196097.4-1202.
Extended European Search Report dated Dec. 7, 2017 in European Application No. 17196176.6.
Macie, et al., "Power processing requirements for solar electric propulsion," Proceedings of the Annual Power Electronics Specialists Conference (PESC), Blackburg, Jun. 22-26, 1987; Proceedings of the Annual Power Electronics Specialists Conference, (PESC), New York, IEEE, US, Apr. 19, 1971.

* cited by examiner

ELECTRIC POWER SYSTEM FOR A SPACE VEHICLE

FIELD

The disclosure generally relates to electrical power systems, and more particularly to the design of an electrical power system for a space vehicle.

BACKGROUND

Space vehicles typically employ electrical power systems for powering various electronic and/or electro-mechanical devices onboard the space vehicle. Electrical storage capacity may be limited during space flight due to the remote nature of space travel. Solar arrays may be used to provide a renewable energy source for the electrical power system.

SUMMARY

In various embodiments, an electrical power system (EPS) is disclosed. An EPS may comprise a first plurality of power sources comprising at least one of a first solar array, a first supercapacitor, and a first battery, a first collector bus configured to receive power from the first plurality of power sources, an unregulated DC bus configured to receive power from the first collector bus, a regulated high voltage direct current (HVDC) bus configured to receive power from the unregulated DC bus, and a first power distribution unit (PDU) configured to receive power from the regulated HVDC bus. The regulated HVDC bus may be configured to supply power to a first load.

In various embodiments, the EPS may further comprise a second plurality of power sources comprising at least one of a second solar array, a second supercapacitor, and a second battery, a second collector bus configured to receive power from the second plurality of power sources, a regulated low voltage direct current (LVDC) bus configured to receive power from the unregulated DC bus, and a second power distribution unit (PDU) configured to receive power from the regulated LVDC bus, wherein the unregulated DC bus is configured to receive power from the second collector bus, and the regulated HVDC bus is configured to supply power to a high voltage load, via the first PDU. The EPS may further comprise a main load sharing regulator configured to regulate the power received by the first collector bus from the first plurality of power sources and configured to regulate the power received by the second collector bus from the second plurality of power sources. The first collector bus and the second collector bus may be connected in parallel. The regulated HVDC bus may be configured to receive power from the unregulated DC bus via a first unidirectional DC/DC converter connected in series with a first intermediate regulated bus and a second unidirectional DC/DC converter connected in series with a second intermediate regulated bus, wherein the first intermediate regulated bus and the second intermediate regulated bus are connected in parallel. The regulated HVDC bus may be further configured to receive power from an emergency power source comprising at least one of an emergency battery and an emergency supercapacitor.

In various embodiments, an EPS is disclosed. An EPS may comprise a main load sharing regulator, a first collector bus in electronic communication with the main load sharing regulator, a first solar array configured to supply power to the first collector bus via a first maximum power point tracking (MPPT) converter, a first battery in electronic communication with the first collector bus via a first bidirectional DC/DC converter, an unregulated DC bus in electronic communication with the first collector bus, a first unidirectional DC/DC converter in electronic communication with the unregulated DC bus, a second unidirectional DC/DC converter in electronic communication with the unregulated DC bus, a first intermediate load sharing regulator in electronic communication with the first unidirectional DC/DC converter and the second unidirectional DC/DC converter, the first intermediate load sharing regulator configured to regulate the first unidirectional DC/DC converter and the second unidirectional DC/DC converter, a first intermediate regulated bus in electronic communication with the first unidirectional DC/DC converter, a second intermediate regulated bus in electronic communication with the first unidirectional DC/DC converter, the first intermediate regulated bus and the second intermediate regulated bus connected in parallel, and a regulated high voltage direct current (HVDC) bus configured to receive power from at least one of the first intermediate regulated bus and the second intermediate regulated bus, wherein the regulated HVDC bus is configured to supply power to a first load.

In various embodiments, the EPS may further comprise a second collector bus in electronic communication with the main load sharing regulator and in electronic communication with the unregulated DC bus, a second solar array configured to supply power to the second collector bus via a second maximum power point tracking (MPPT) converter, a second battery in electronic communication with the second collector bus via a second bidirectional DC/DC converter, a third unidirectional DC/DC converter in electronic communication with the unregulated DC bus, a fourth unidirectional DC/DC converter in electronic communication with the unregulated DC bus, a second intermediate load sharing regulator in electronic communication with the third unidirectional DC/DC converter and the fourth unidirectional DC/DC converter, the second intermediate load sharing regulator configured to regulate the third unidirectional DC/DC converter and the fourth unidirectional DC/DC converter, a third intermediate regulated bus in electronic communication with the first unidirectional DC/DC converter, a fourth intermediate regulated bus in electronic communication with the first unidirectional DC/DC converter, the first intermediate regulated bus and the second intermediate regulated bus connected in parallel, and a regulated low voltage direct current (LVDC) bus configured to receive power from at least one of the third intermediate regulated bus and the fourth intermediate regulated bus, wherein the regulated LVDC bus is configured to supply power to a second load. The first collector bus and the second collector bus may be connected in parallel. The unregulated DC bus may be connected in series with the first collector bus and connected in series with the second collector bus. The main load sharing regulator may control the first MPPT converter, the second MPPT converter, the first bidirectional DC/DC converter, and the second bidirectional DC/DC converter. The first collector bus, the unregulated DC bus, the first unidirectional DC/DC converter, the first intermediate regulated bus, and the regulated HVDC bus may be connected in series. The first unidirectional DC/DC converter and the second unidirectional DC/DC converter may be connected in parallel. The first load may comprise a high voltage load and the second load may comprise a low voltage load. The first battery may be configured to at least one of receive power from the first collector bus, via the first bidirectional DC/DC converter and supply power to the first collector bus, via the first bidirectional DC/DC converter. The EPS may further comprise a supercapacitor in electronic communication with the first collector bus configured to at least one of receive power from the first collector bus, via a third bidirectional DC/DC converter, and supply power to the first collector bus, via the third bidirectional DC/DC converter. The EPS may further comprise an emergency supercapacitor in electronic communication with the regulated HVDC bus configured to at least one of receive power from the regulated HVDC bus, via a first emergency bidirectional DC/DC converter, and supply power to the regulated HVDC bus, via the first emergency bidirectional DC/DC converter. The EPS may further comprise an emergency battery in electronic communication with the regulated HVDC bus configured to at least one of receive power from the regulated HVDC bus, via a second emergency bidirectional DC/DC converter, and supply power to the regulated HVDC bus, via the second emergency bidirectional DC/DC converter.

In various embodiments, a method for supplying electric power to a load is disclosed. The method for supplying electric power to a load may comprise receiving, by a first collector bus, electric power from a first plurality of electric power sources, receiving, by a second collector bus, electric power from a second plurality of electric power sources, regulating, by a main load sharing regulator, the electric power received by the first collector bus and the electric power received by the second collector bus, receiving, by an unregulated DC bus, electric power from at least one of the first collector bus and the second collector bus, the first collector bus and the second collector bus connected in parallel, receiving, by a regulated high voltage direct current (HVDC) bus, electric power from the unregulated DC bus, and receiving, by the load, electric power from the regulated HVDC bus.

In various embodiments, the receiving, by the first collector bus, electric power from the first plurality of electric power sources may comprise receiving the electric power from at least one of a first solar array, a first battery, and a first supercapacitor. The receiving, by the second collector bus, electric power from the second plurality of electric power sources may comprise receiving the electric power from at least one of a second solar array, a second battery, and a second supercapacitor.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
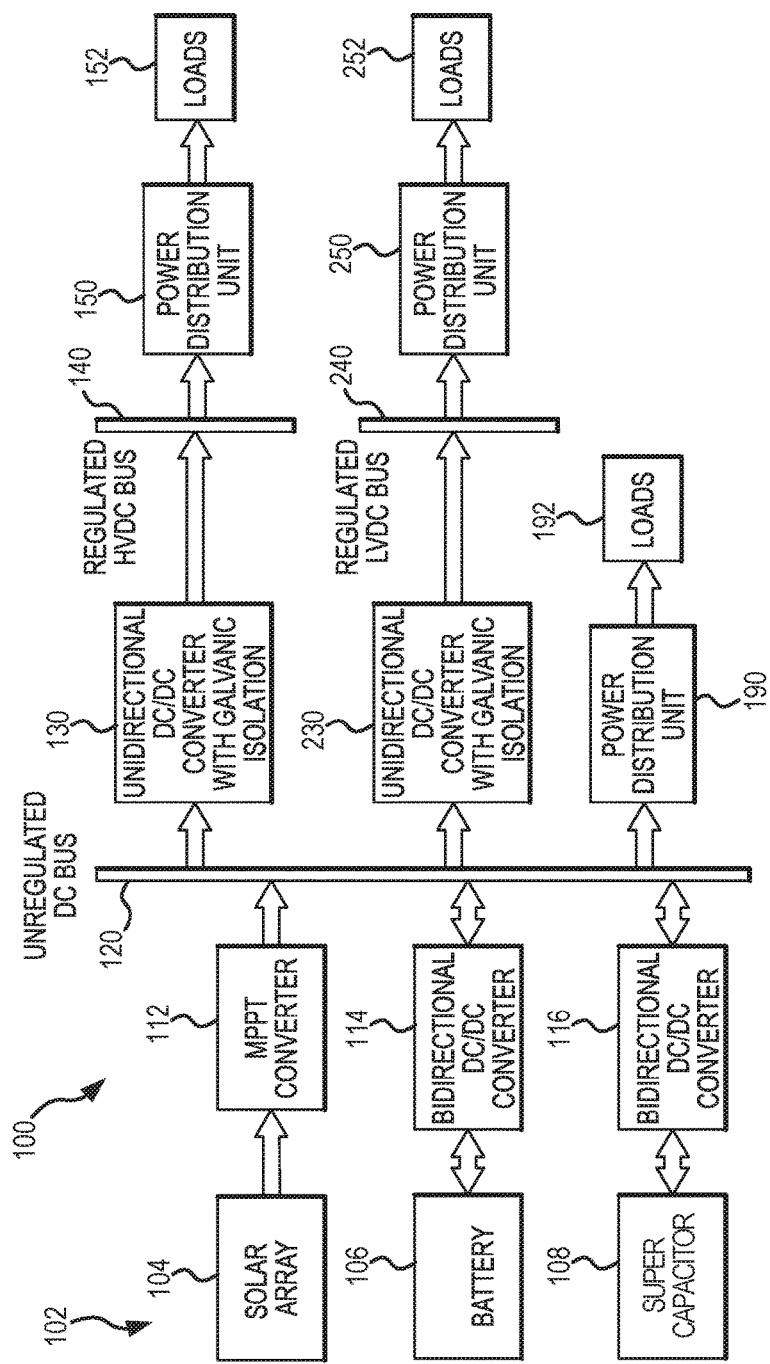
FIG. 1 illustrates a schematic view of an electric power system (EPS), in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). In that regard, use of the term "electronic communication" includes both "electrical communication" and "inductive communication."

As used herein, "connected" or "coupled" means "in electronic communication." As used herein, "direct electronic communication" means communication of electronic signals with no intermediary devices in the "electronic communication" other than a conduit for power, such as a wire.

Electrical power systems, as described herein, may provide redundancy in delivering electrical power to loads to maintain safe take-off, flight, and landing of a space vehicle. Electrical power systems, as described herein, may reduce electrical and thermal stresses on power electronics components during normal operation. Electrical power systems, as described herein, may support dynamic peak power typically associated with operation of actuators, such as rapid acceleration or regeneration, without oversizing the electrical power system.

With reference to FIG. 1, an electrical power system (EPS) 100 is illustrated, in accordance with various embodiments. EPS 100 may include a plurality of power sources (also referred to herein as a first plurality of power sources) 102. Power sources 102 may include a solar array (also referred to herein as a first solar array) 104, a battery (also referred to herein as a first battery) 106, and/or a supercapacitor (also referred to herein as a first supercapacitor) 108. Solar array 104 may comprise a solar photovoltaic power system. Battery 106 may comprise a lithium-ion battery. EPS 100 may include unregulated DC bus 120. Power sources 102 may supply power to unregulated direct current (DC) bus 120. Solar array 104 may supply power to unregulated DC bus 120. Battery 106 may supply power to unregulated DC bus 120. In various embodiments, unregulated DC bus 120 may supply power to battery 106. Solar array 104 may supply power to battery 106, via unregulated DC bus 120, in response to battery 106 having a charge which is less than a threshold value, for example. Solar array 104 may supply power to battery 106, via unregulated DC bus 120, in response to solar array 104 supplying power to unregulated DC bus 120 while solar array 104 receives sunlight. Supercapacitor 108 may supply power to unregulated DC bus 120. In various embodiments, unregulated DC bus 120 may supply power to supercapacitor 108. For example, solar array 104 may supply power to supercapacitor 108 via unregulated DC bus 120.

In various embodiments, EPS 100 may include a maximum power point tracking (MPPT) converter (also referred to herein as a first MPPT converter) 112, a bidirectional DC/DC converter (also referred to herein as a first bidirectional DC/DC converter) 114, and bidirectional DC/DC converter (also referred to herein as a second bidirectional DC/DC converter) 116. MPPT converter 112 may be coupled between solar array 104 and unregulated DC bus 120. Bidirectional DC/DC converter 114 may be coupled between battery 106 and unregulated DC bus 120. Bidirectional DC/DC converter 116 may be coupled between supercapacitor 108 and unregulated DC bus 120. In various embodiments, MPPT converter 112, bidirectional DC/DC converter 114, and bidirectional DC/DC converter 116 may connected in direct electronic communication with unregulated DC bus 120.

In various embodiments, EPS 100 may include a unidirectional DC/DC converter (also referred to herein as a first unidirectional DC/DC converter) 130 and a regulated high voltage direct current (HVDC) bus 140. Thus, unregulated DC bus 120 may supply power to regulated HVDC bus 140 via unidirectional DC/DC converter 130. Unregulated DC bus 120 may supply power to regulated HVDC bus 140 via unidirectional DC/DC converter 130. Unidirectional DC/DC converter 130 may be connected in series between unregulated DC bus 120 and regulated HVDC bus 140. In various embodiments, unidirectional DC/DC converter 130 may be connected, in direct electronic communication, in series between unregulated DC bus 120 and regulated HVDC bus 140. Unidirectional DC/DC converter 130 and unidirectional DC/DC converter 230 may each be galvanically isolated.

In various embodiments, unregulated DC bus 120 may supply power to a regulated low voltage direct current (LVDC) bus 240. Unregulated DC bus 120 may supply power to regulated LVDC bus 240 via a unidirectional DC/DC converter (also referred to herein as a third unidirectional DC/DC converter) 230. Unidirectional DC/DC converter 230 may be connected in series between unregulated DC bus 120 and regulated LVDC bus 240. In various embodiments, unidirectional DC/DC converter 230 may be connected, in direct electronic communication, in series between unregulated DC bus 120 and regulated LVDC bus 240.

In various embodiments, EPS 100 may include power distribution unit (PDU) (also referred to herein as a first PDU) 150. In various embodiments, PDU 150 may be connected, in direct electronic communication, with regulated HVDC bus 140. PDU 150 may distribute electric power from regulated HVDC bus 140 to loads 152. PDU 150 may comprise electric fuses, or circuit breakers. In various embodiments, EPS 100 may include PDU (also referred to herein as a second PDU) 250. In various embodiments, PDU 250 may be connected, in direct electronic communication, with regulated LVDC bus 240. PDU 250 may distribute electric power from regulated LVDC bus 240 to loads 252. Loads 152 may be referred to herein as a first plurality of loads. Loads 252 may be referred to herein as a second plurality of loads.

In various embodiments, EPS 100 may include a PDU 190. Unregulated DC bus 120 may supply power to PDU 190. In various embodiments, PDU 190 may be connected, in direct electronic communication, with unregulated DC bus 120. PDU 190 may direct said power to various loads 192. In various embodiments, loads 192 may comprise actuators, motors, lights, or any other electronic device configured to receive power.

With respect to FIGS. 2A, 2B, 3A, 3B, 4A, and 4B elements with like element numbering, as depicted in FIG. 1, are intended to be the same and will not necessarily be repeated for the sake of clarity.

Figure 2A:
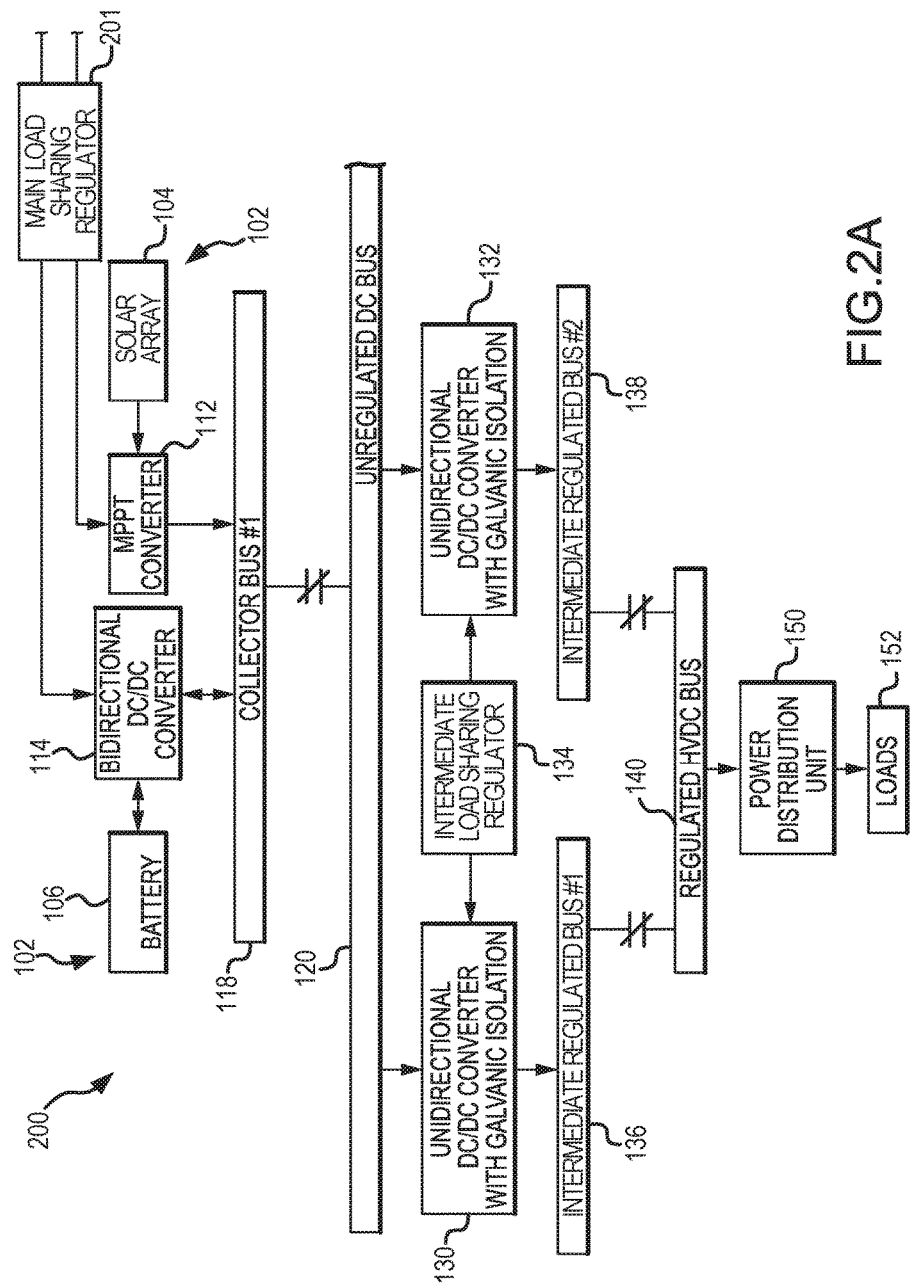
FIGS. 2A and 2B illustrate a schematic view of an EPS having a first plurality of power sources and a second plurality of power sources configured to supply electrical power to a single unregulated direct current (DC) bus, in accordance with various embodiments.
Figure 2B:
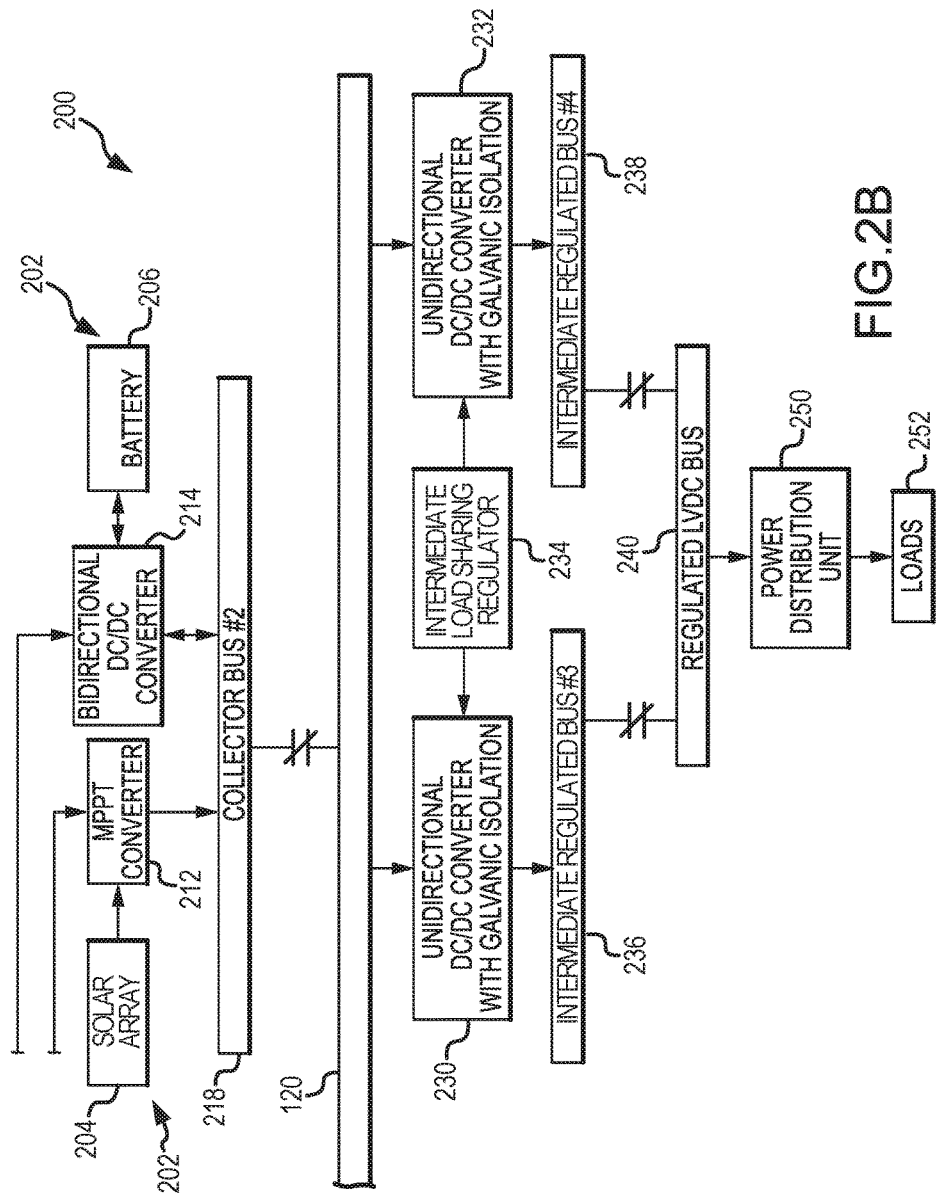

With combined reference to FIG. 2A and FIG. 2B, an EPS 200 with failsafe and robust architecture is illustrated, in accordance with various embodiments. EPS 200 may be similar to EPS 100, with momentary reference to FIG. 1. EPS 200 may include first collector bus 118 connected in series between MPPT converter 112 and unregulated DC bus 120. First collector bus 118 may receive power from solar array 104, via MPPT converter 112. First collector bus 118 may receive power from battery 106, via bidirectional DC/DC converter 114. In various embodiments, battery 106 may receive power from solar array 104, via first collector bus 118.

In various embodiments, EPS 200 may include a unidirectional DC/DC converter (also referred to herein as a second unidirectional DC/DC converter) 132, an intermediate load sharing regulator (also referred to herein as a first intermediate load sharing regulator) 134, a first intermediate regulated bus 136, and a second intermediate regulated bus 138. Unidirectional DC/DC converter 132 may receive power from unregulated DC bus 120. Intermediate load sharing regulator 134 may be in electronic communication with unidirectional DC/DC converter 130 and in electronic communication with unidirectional DC/DC converter 132. Intermediate load sharing regulator 134 may regulate power received by first intermediate regulated bus 136 from unidirectional DC/DC converter 130. Intermediate load sharing regulator 134 may regulate power received by second intermediate regulated bus 138 from unidirectional DC/DC converter 132. First intermediate regulated bus 136 and second intermediate regulated bus 138 may be configured in parallel. Regulated HVDC bus 140 may receive power from first intermediate regulated bus 136 and/or second intermediate regulated bus 138.

With continued combined reference to FIG. 2A and FIG. 2B, EPS 200 may include a plurality of power sources (also referred to herein as a second plurality of power sources) 202, and a second collector bus 218. Power sources 202 may include solar array (also referred to herein as a second solar array) 204, an MPPT converter (also referred to herein as a second MPPT converter) 212, a bidirectional DC/DC converter (also referred to herein as a second bidirectional DC/DC converter) 214, a battery (also referred to herein as a second battery) 206. Power sources 202, MPPT converter 212, and bidirectional DC/DC converter 214 may be similar to power sources 102, MPPT converter 112, and bidirectional DC/DC converter 114, respectively.

In various embodiments, EPS 200 may include a main load sharing regulator 201. Main load sharing regulator 201 may be in electronic communication with MPPT converter 112, bidirectional DC/DC converter 114, MPPT converter 212, and bidirectional DC/DC converter 214. Main load sharing regulator 201 may regulate the power received by first collector bus 118 from solar array 104 and battery 106. Main load sharing regulator 201 may regulate the power received by second collector bus 218 from solar array 204 and battery 206. In various embodiments, main load sharing regulator 201 may regulate the power received by battery 106 and battery 206 from solar array 104 and solar array 204, respectively.

In various embodiments, second collector bus 218 may be connected in series between MPPT converter 212 and unregulated DC bus 120. Second collector bus 218 may receive power from solar array 204, via MPPT converter 212. Second collector bus 218 may receive power from battery 206, via bidirectional DC/DC converter 214. In various embodiments, battery 206 may receive power from solar array 204, via second collector bus 218. First collect bus 118 and second collector bus 218 may be connected in parallel.

In various embodiments, EPS 200 may include a unidirectional DC/DC converter (also referred to herein as a third unidirectional DC/DC converter) 230, a unidirectional DC/DC converter (also referred to herein as a fourth unidirectional DC/DC converter) 232, an intermediate load sharing regulator (also referred to herein as a second intermediate load sharing regulator) 234, a third intermediate regulated bus 236, and a fourth intermediate regulated bus 238. Unidirectional DC/DC converter 230 may receive power from unregulated DC bus 120. Unidirectional DC/DC converter 232 may receive power from unregulated DC bus 120. Intermediate load sharing regulator 234 may be in electronic communication with unidirectional DC/DC converter 230 and in electronic communication with unidirectional DC/DC converter 232. Intermediate load sharing regulator 234 may regulate power received by third intermediate regulated bus 236 from unidirectional DC/DC converter 230. Intermediate load sharing regulator 234 may regulate power received by fourth intermediate regulated bus 238 from unidirectional DC/DC converter 232. Third intermediate regulated bus 236 and fourth intermediate regulated bus 238 may be in parallel. Regulated LVDC bus 240 may receive power from third intermediate regulated bus 236 and/or fourth intermediate regulated bus 238.

Figure 3A:
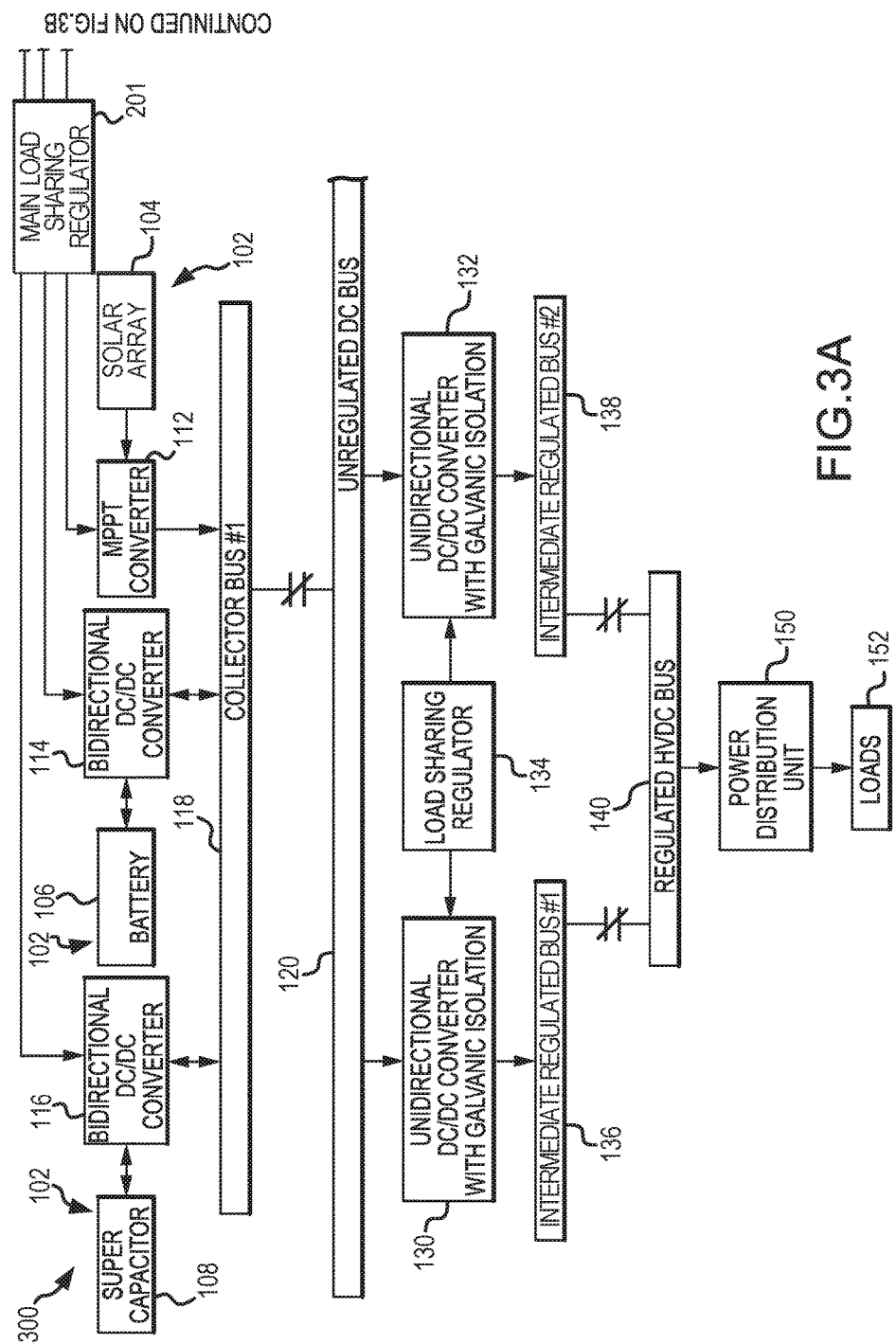
FIGS. 3A and 3B illustrate a schematic view of an EPS having a first plurality of power sources and a second plurality of power sources configure to supply electrical power to a single unregulated DC bus, in accordance with various embodiments.
Figure 3B:
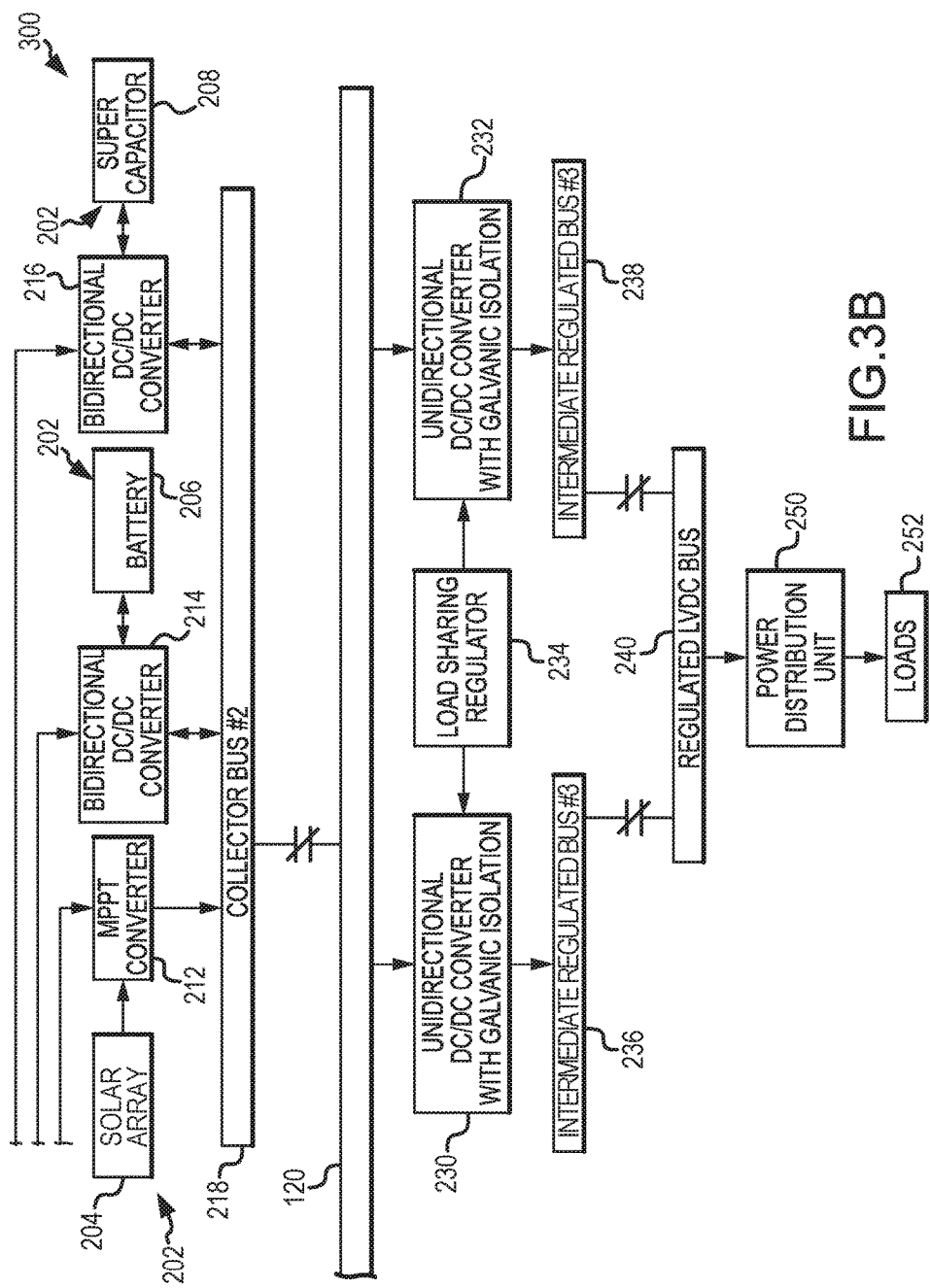

With combined reference to FIG. 3A and FIG. 3B, EPS 300 may be similar to EPS 200, with momentary reference to FIG. 2A and FIG. 2B. EPS 300 may include a supercapacitor 108 and a bidirectional DC/DC converter (also referred to herein as a third bidirectional DC/DC converter) 116. Bidirectional DC/DC converter 116 may be in electronic communication with main load sharing regulator 201. Main load sharing regulator 201 may regulate bidirectional DC/DC converter 116. Supercapacitor 108 may supply power to first collector bus 118. Supercapacitor 108 may receive power from solar array 104, via first collector bus 118.

EPS 300 may include a supercapacitor (also referred to herein as a second supercapacitor) 208 and bidirectional DC/DC converter (also referred to herein as a fourth bidirectional DC/DC converter) 216. Bidirectional DC/DC converter 216 may be in electronic communication with main load sharing regulator 201. Main load sharing regulator 201 may regulate bidirectional DC/DC converter 216. Supercapacitor 208 may supply power to second collector bus 218. Supercapacitor 108 may receive power from solar array 104, via second collector bus 218.

Figure 4A:
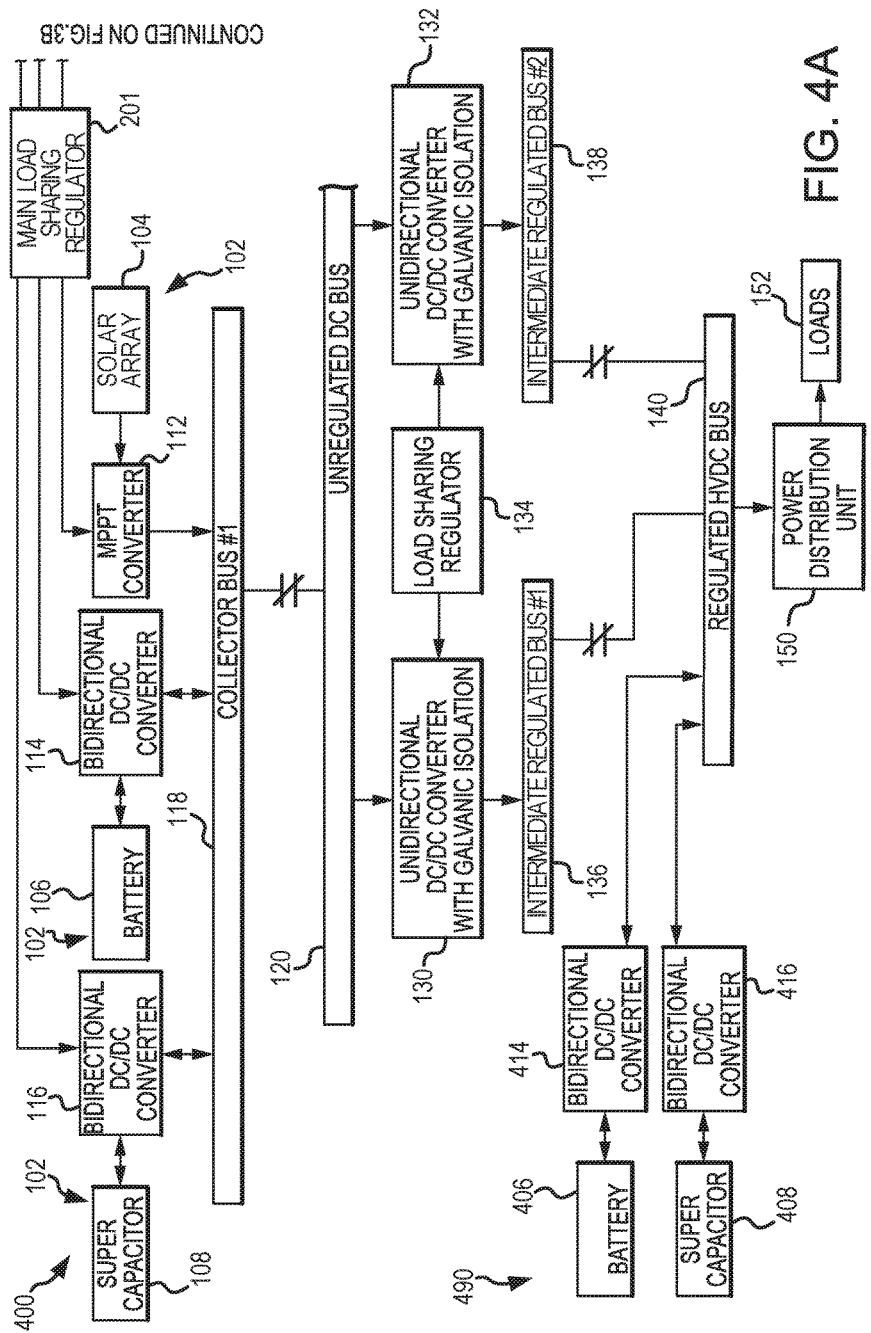
FIGS. 4A and 4B illustrate a schematic view of an EPS having a first plurality of power sources and a second plurality of power sources supplying electrical power to a single unregulated DC bus, and having emergency power sources configured to supply electrical power to a regulated high voltage DC bus and emergency power sources configured to supply electrical power to a regulated low voltage DC bus, in accordance with various embodiments.
Figure 4B:
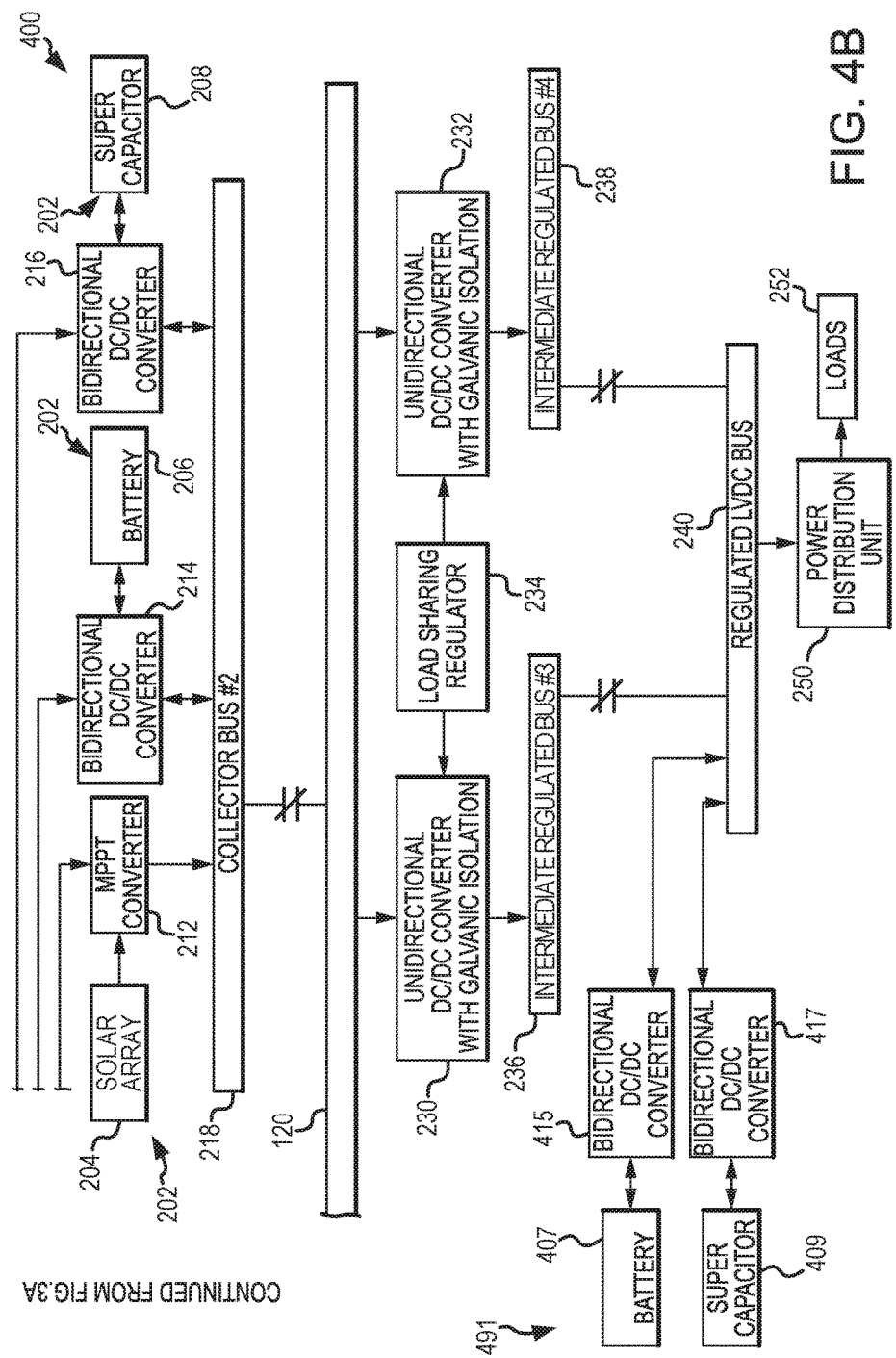

With combined reference to FIG. 4A and FIG. 4B, EPS 400 may be similar to EPS 300, with momentary reference to FIG. 3A and FIG. 3B. EPS 400 may include emergency power sources 490. Emergency power sources 490 may include battery 406 and supercapacitor 408. Battery 406 and supercapacitor 408 may be similar to battery 106 and supercapacitor 108, with momentary reference to FIG. 3A. Regulated HVDC bus 140 may receive power from power sources 490. A bidirectional DC/DC converter 414 may be coupled between battery 406 and regulated HVDC bus 140. A bidirectional DC/DC converter 416 may be coupled between supercapacitor 408 and regulated HVDC bus 140. In various embodiments, power sources 490 may receive power from regulated HVDC bus 140, for example to charge power sources 490. Power sources 490 may be configured to supply power to regulated HVDC bus 140 in response to regulated HVDC bus 140 not receiving sufficient power from unregulated DC bus 120 to operate loads 152. In various embodiments, loads 152 may comprise high voltage loads.

EPS 400 may include emergency power sources 491. Emergency power sources 491 may include battery 407 and supercapacitor 409. Battery 407 and supercapacitor 409 may be similar to battery 206 and supercapacitor 208, with momentary reference to FIG. 3B. Regulated LVDC bus 240 may receive power from power sources 491. A bidirectional DC/DC converter 415 may be coupled between battery 407 and regulated LVDC bus 240. A bidirectional DC/DC converter 417 may be coupled between supercapacitor 409 and regulated LVDC bus 240. In various embodiments, power sources 491 may receive power from regulated LVDC bus 240, for example to charge power sources 491. Power sources 491 may be configured to supply power to regulated LVDC bus 240 in response to regulated LVDC bus 240 not receiving sufficient power from unregulated DC bus 120 to operate loads 252. In various embodiments, loads 252 may comprise low voltage loads.

Figure 5:
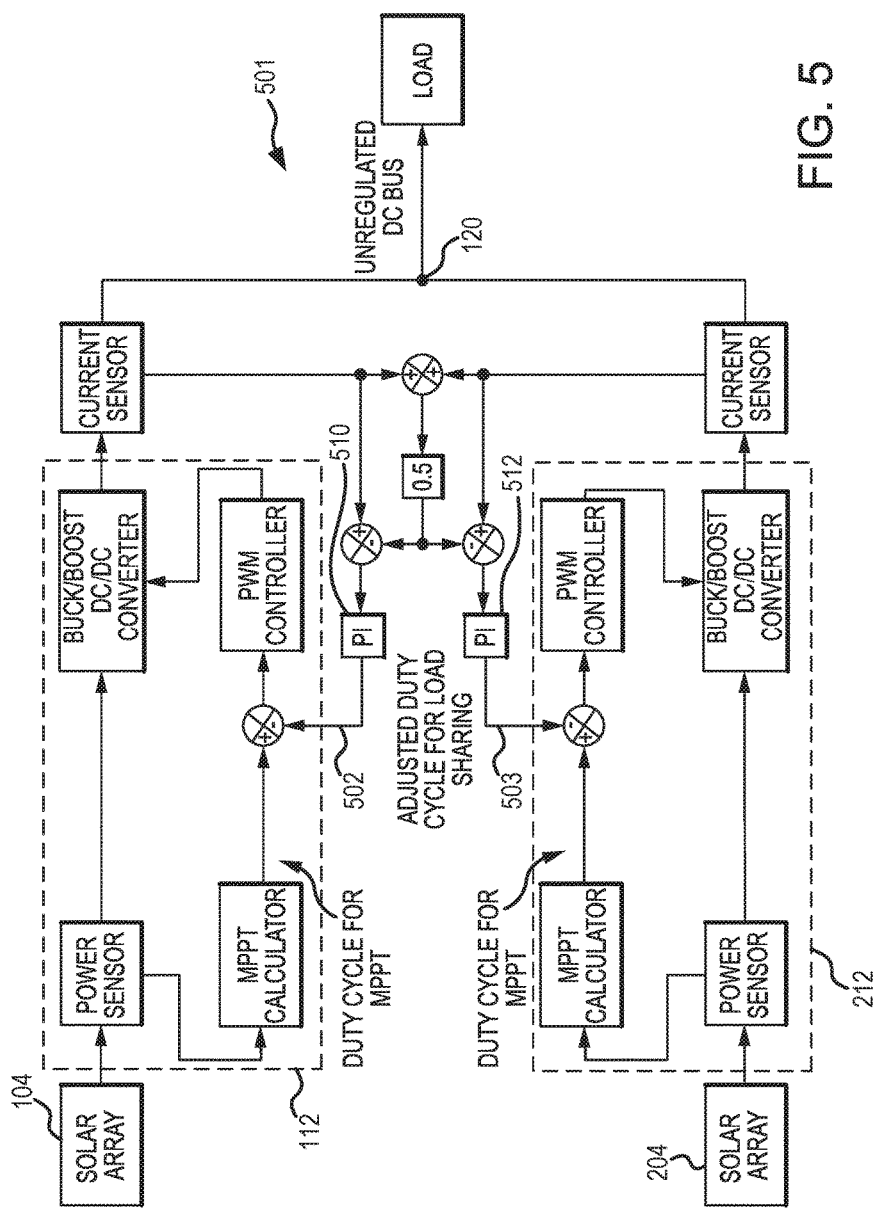
FIG. 5 illustrates a schematic view of a load sharing regulator configured to regulate electric power supplied by a first solar array and a second solar array, in accordance with various embodiments.

With reference to FIG. 5, a schematic view of a load sharing regulator 501 in electronic communication with solar array 104 and solar array 204 is illustrated, in accordance with various embodiments. In various embodiments, main load sharing regulator 201 may be similar to load sharing regulator 501, with momentary reference to FIG. 2A. Load sharing regulator 501 may regulate the power received from solar array 104 and solar array 204 to balance the output currents of solar array 104 and solar array 204 received by unregulated DC bus 120. More specifically, load sharing regulator 501 may control current output from MPPT converter 112 and current output from MPPT converter 212. The average current output between MPPT converter 112 and MPPT converter 212 may be subtracted from the actual current output of MPPT converter 112 and MPPT converter 212 to produce a first error signal sent to a first proportional-integral (PI) controller 510 and a second error signal sent to a second PI controller 512. The first PI controller 510 and the second PI controller 512 may then output a first duty cycle signal 502 and a duty cycle signal 503, respectively. The first duty cycle signal 502 may be received by a summing block included in the MPPT converter 112 which is used by the corresponding pulse width modulator (PWM) controller. The second duty cycle signal 503 may be received by a summing block included in the MPPT converter 212 which is used by the corresponding PWM controller. In this regard, the load current is controlled.

Figure 6:
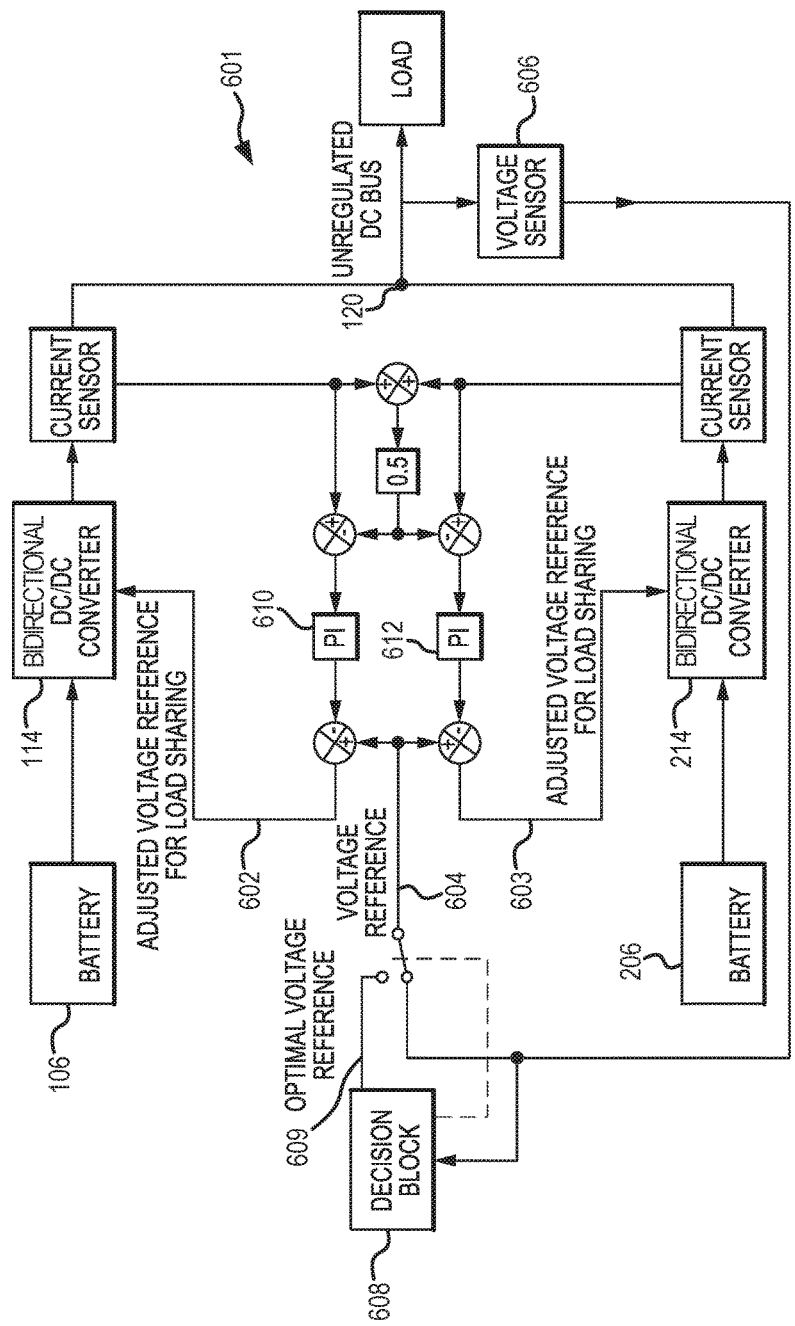
FIG. 6 illustrates a schematic view of a load sharing regulator configured to regulate electric power supplied by a first battery and a second battery, in accordance with various embodiments.

With reference to FIG. 6, a schematic view of a load sharing regulator 601 in electronic communication with battery 106 and battery 206 is illustrated, in accordance with various embodiments. In various embodiments, main load sharing regulator 201 may be similar to load sharing regulator 601, with momentary reference to FIG. 2A. Load sharing regulator 601 may regulate the power received from battery 106 and battery 206 to balance the output currents of bidirectional DC/DC converter 114 and bidirectional DC/DC converter 214 received by unregulated DC bus 120. The average current output between bidirectional DC/DC converter 114 and bidirectional DC/DC converter 214 may be subtracted from the actual current output of bidirectional DC/DC converter 114 and bidirectional DC/DC converter 214 to produce a first error signal sent to a first PI controller 610 and a second error signal sent to a second PI controller 612. The PI controller 610 and the PI controller 612 may then output an adjusted voltage reference 602 and an adjusted voltage reference 603, respectively. The adjusted voltage reference 602 and adjusted voltage reference 603 may be received by bidirectional DC/DC converter 114 and bidirectional DC/DC converter 214, respectively. A voltage reference 604 is received from a voltage sensor 606 in electronic communication with the unregulated DC bus 120. A decision block 608 may indicate to use the voltage reference 604 from the voltage sensor 606. Decision block 608 may indicate to use the voltage reference 604 from an optimal voltage reference 609 in response to the voltage of the unregulated DC bus 120 dropping below a threshold value. In this regard, load sharing regulator 601 may draw electric power from battery 106 and battery 206 in response to the voltage of unregulated DC bus 120 dropping below a threshold value. In this regard, the load current is controlled.

Figure 7:
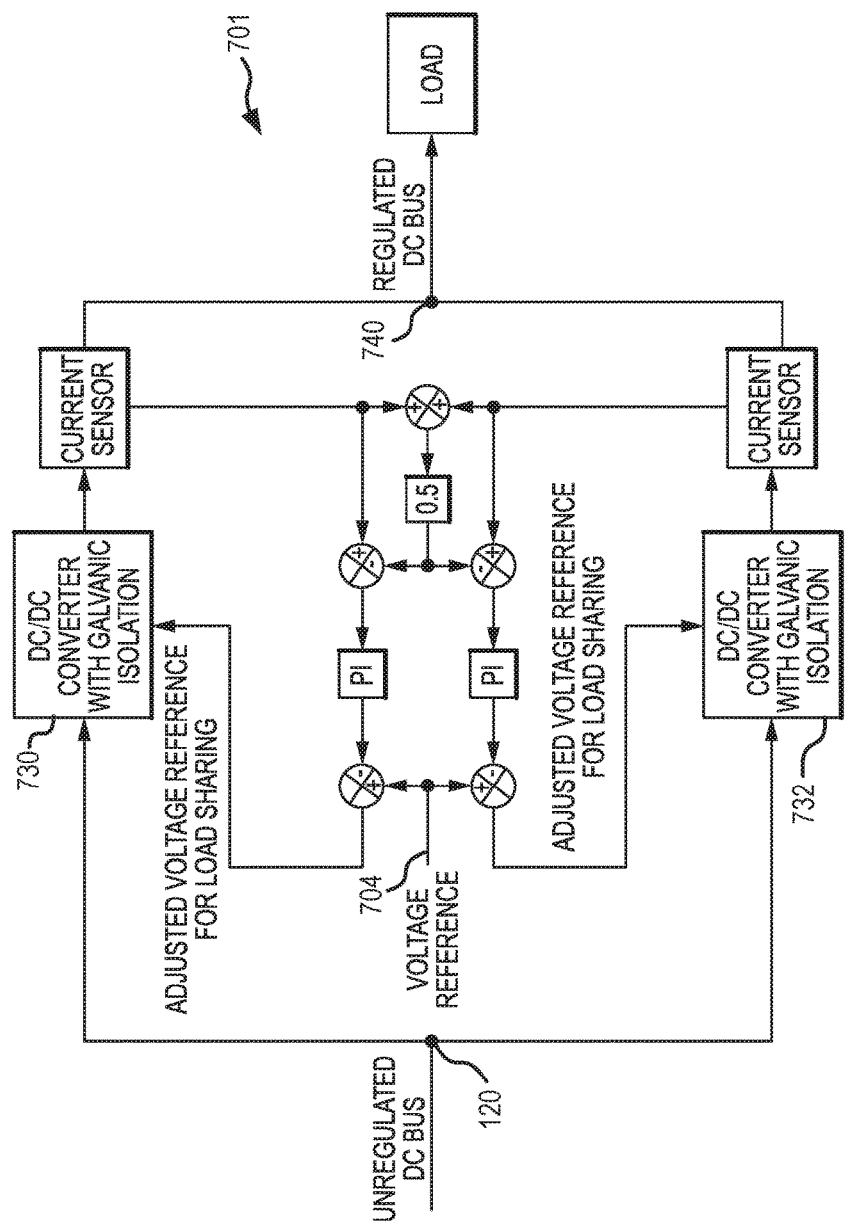
FIG. 7 illustrates a schematic view of a load sharing regulator for a first DC/DC converter and a second DC/DC converter connected in parallel to an unregulated DC bus, in accordance with various embodiments.

With reference to FIG. 7, a schematic view of a load sharing regulator 701 in electronic communication with DC/DC converter 730 and DC/DC converter 732 is illustrated, in accordance with various embodiments. In various embodiments, DC/DC converter 730 and DC/DC converter 732 may be similar to unidirectional DC/DC converter 130 and unidirectional DC/DC converter 132, respectively, with momentary reference to FIG. 2A. In various embodiments, DC/DC converter 730 and DC/DC converter 732 may be similar to unidirectional DC/DC converter 230 and unidirectional DC/DC converter 232, respectively, with momentary reference to FIG. 2B. Load sharing regulator 701 may regulate the power received from unregulated DC bus 120, via DC/DC converter 730 and DC/DC converter 732 to balance the output currents of DC/DC converter 730 and DC/DC converter 732 received by regulated DC bus 740. In various embodiments, regulated HVDC bus 140 may be similar to regulated DC bus 740, with momentary reference to FIG. 2A. In various embodiments, regulated LVDC bus 240 may be similar to regulated DC bus 740, with momentary reference to FIG. 2B. In various embodiments, voltage reference 704 may comprise a desired value of regulated HVDC bus 140, for example 270 volts. In various embodiments, voltage reference 704 may comprise a desired value of regulated LVDC bus 240, for example 28 volts.

Figure 8:
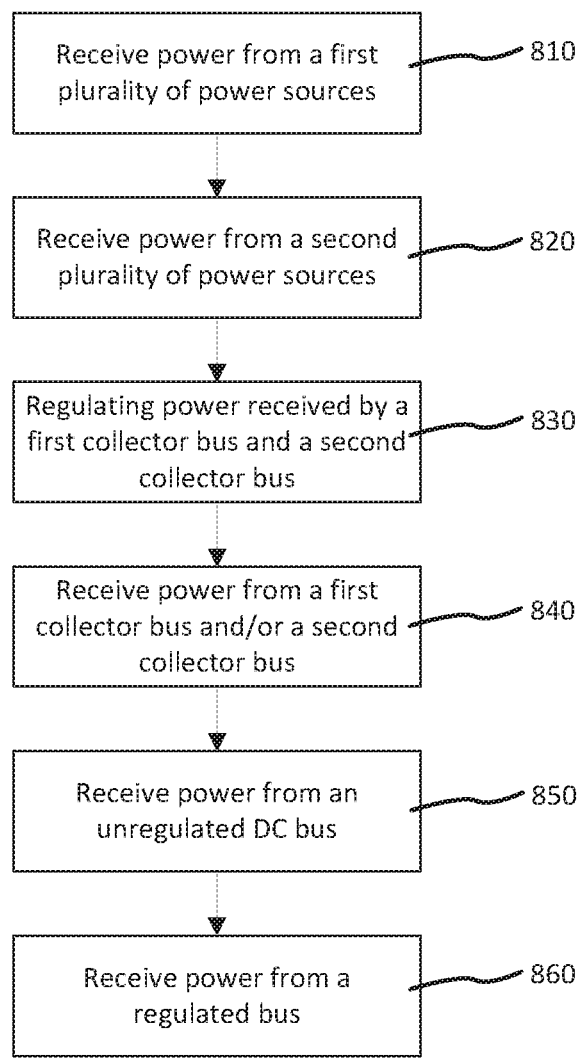
FIG. 8 illustrates a method for supplying electric power to a load, in accordance with various embodiments.

With reference to FIG. 8, a method 800 for supplying power to a load is illustrated, in accordance with various embodiments. Method 800 includes receiving power from a first plurality of power sources (step 810). Method 800 includes receiving power from a second plurality of power sources (step 820). Method 800 includes regulating power received by a first collector bus and a second collector bus (step 830). Method 800 includes receiving power from a first collector bus and/or a second collector bus (step 840). Method 800 includes receiving power from an unregulated DC bus (step 850). Method 800 includes receiving power from a regulated bus (step 860).

With combined reference to FIG. 3A, FIG. 3B, and FIG. 8, step 810 may include receiving, by first collector bus 118, power from a first plurality of power sources 102. Step 820 may include receiving, by second collector bus 218, power from a second plurality of power sources 202. Step 830 may include regulating, by main load sharing regulator 201, the power received by first collector bus 118 and the power received by second collector bus 218. Step 840 may include receiving, by unregulated DC bus 120, power from at least one of the first collector bus 118 and the second collector bus 218. Step 850 may include receiving, by regulated HVDC bus 140, power from the unregulated DC bus 120. Step 850 may include receiving, by regulated LVDC bus 240, power from the unregulated DC bus 120. Step 860 may include receiving, by loads 152, power from regulated HVDC bus 140. Step 860 may include receiving, by loads 252, power from regulated LVDC bus 240. In various embodiments, loads 252 may comprise low voltage loads.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electrical power system comprising:
   a first plurality of power sources comprising at least one of a first solar array, a first supercapacitor, and a first battery;
   a first collector bus configured to receive power from the first plurality of power sources;
   an unregulated DC bus configured to receive power from the first collector bus;
   a regulated high voltage direct current (HVDC) bus configured to receive power from the unregulated DC bus; and
   a first power distribution unit (PDU) configured to receive power from the regulated HVDC bus,
   wherein the regulated HVDC bus is configured to supply power to a first load.

2. The electrical power system of claim 1, further comprising:
   a second plurality of power sources comprising at least one of a second solar array, a second supercapacitor, and a second battery;
   a second collector bus configured to receive power from the second plurality of power sources;
   a regulated low voltage direct current (LVDC) bus configured to receive power from the unregulated DC bus; and
   a second power distribution unit (PDU) configured to receive power from the regulated LVDC bus,
   wherein the unregulated DC bus is configured to receive power from the second collector bus, and
   the regulated HVDC bus is configured to supply power to a high voltage load, via the first PDU.

3. The electrical power system of claim 2, further comprising a main load sharing regulator configured to regulate the power received by the first collector bus from the first plurality of power sources and configured to regulate the power received by the second collector bus from the second plurality of power sources.

4. The electrical power system of claim 3, wherein the first collector bus and the second collector bus are connected in parallel.

5. The electrical power system of claim 4, wherein the regulated HVDC bus is configured to receive power from the unregulated DC bus via:
   a first unidirectional DC/DC converter connected in series with a first intermediate regulated bus; and
   a second unidirectional DC/DC converter connected in series with a second intermediate regulated bus,
   wherein the first intermediate regulated bus and the second intermediate regulated bus are connected in parallel.

6. The electrical power system of claim 5, wherein the regulated HVDC bus is further configured to receive power from an emergency power source comprising at least one of an emergency battery and an emergency supercapacitor.

7. An electrical power system comprising:
   a main load sharing regulator;
   a first collector bus in electronic communication with the main load sharing regulator;
   a first solar array configured to supply power to the first collector bus via a first maximum power point tracking (MPPT) converter;
   a first battery in electronic communication with the first collector bus via a first bidirectional DC/DC converter;
   an unregulated DC bus in electronic communication with the first collector bus;
   a first unidirectional DC/DC converter in electronic communication with the unregulated DC bus;
   a second unidirectional DC/DC converter in electronic communication with the unregulated DC bus;
   a first intermediate load sharing regulator in electronic communication with the first unidirectional DC/DC converter and the second unidirectional DC/DC converter, the first intermediate load sharing regulator configured to regulate the first unidirectional DC/DC converter and the second unidirectional DC/DC converter;
   a first intermediate regulated bus in electronic communication with the first unidirectional DC/DC converter;
   a second intermediate regulated bus in electronic communication with the first unidirectional DC/DC converter, the first intermediate regulated bus and the second intermediate regulated bus connected in parallel; and
   a regulated high voltage direct current (HVDC) bus configured to receive power from at least one of the first intermediate regulated bus and the second intermediate regulated bus, wherein the regulated HVDC bus is configured to supply power to a first load.

8. The electrical power system of claim 7, further comprising:
a second collector bus in electronic communication with the main load sharing regulator and in electronic communication with the unregulated DC bus,
a second solar array configured to supply power to the second collector bus via a second maximum power point tracking (MPPT) converter;
a second battery in electronic communication with the second collector bus via a second bidirectional DC/DC converter;
a third unidirectional DC/DC converter in electronic communication with the unregulated DC bus;
a fourth unidirectional DC/DC converter in electronic communication with the unregulated DC bus;
a second intermediate load sharing regulator in electronic communication with the third unidirectional DC/DC converter and the fourth unidirectional DC/DC converter, the second intermediate load sharing regulator configured to regulate the third unidirectional DC/DC converter and the fourth unidirectional DC/DC converter;
a third intermediate regulated bus in electronic communication with the first unidirectional DC/DC converter;
a fourth intermediate regulated bus in electronic communication with the first unidirectional DC/DC converter, the first intermediate regulated bus and the second intermediate regulated bus connected in parallel; and
a regulated low voltage direct current (LVDC) bus configured to receive power from at least one of the third intermediate regulated bus and the fourth intermediate regulated bus, wherein the regulated LVDC bus is configured to supply power to a second load.

9. The electrical power system of claim 8, wherein the first collector bus and the second collector bus are connected in parallel.

10. The electrical power system of claim 9, wherein the unregulated DC bus is connected in series with the first collector bus and connected in series with the second collector bus.

11. The electrical power system of claim 10, wherein the main load sharing regulator controls the first MPPT converter, the second MPPT converter, the first bidirectional DC/DC converter, and the second bidirectional DC/DC converter.

12. The electrical power system of claim 11, wherein the first collector bus, the unregulated DC bus, the first unidirectional DC/DC converter, the first intermediate regulated bus, and the regulated HVDC bus are connected in series.

13. The electrical power system of claim 12, wherein the first unidirectional DC/DC converter and the second unidirectional DC/DC converter are connected in parallel.

14. The electrical power system of claim 13, wherein the first load comprises a high voltage load and the second load comprises a low voltage load.

15. The electrical power system of claim 14, wherein the first battery is configured to at least one of receive power from the first collector bus, via the first bidirectional DC/DC converter and supply power to the first collector bus, via the first bidirectional DC/DC converter.

16. The electrical power system of claim 15, further comprising a supercapacitor in electronic communication with the first collector bus configured to at least one of receive power from the first collector bus, via a third bidirectional DC/DC converter, and supply power to the first collector bus, via the third bidirectional DC/DC converter.

17. The electrical power system of claim 16, further comprising an emergency supercapacitor in electronic communication with the regulated HVDC bus configured to at least one of receive power from the regulated HVDC bus, via a first emergency bidirectional DC/DC converter, and supply power to the regulated HVDC bus, via the first emergency bidirectional DC/DC converter.

18. The electrical power system of claim 17, further comprising an emergency battery in electronic communication with the regulated HVDC bus configured to at least one of receive power from the regulated HVDC bus, via a second emergency bidirectional DC/DC converter, and supply power to the regulated HVDC bus, via the second emergency bidirectional DC/DC converter.

19. A method for supplying electric power to a load comprising:
receiving, by a first collector bus, electric power from a first plurality of electric power sources;
receiving, by a second collector bus, electric power from a second plurality of electric power sources;
regulating, by a main load sharing regulator, the electric power received by the first collector bus and the electric power received by the second collector bus;
receiving, by an unregulated DC bus, electric power from at least one of the first collector bus and the second collector bus, the first collector bus and the second collector bus connected in parallel;
receiving, by a regulated high voltage direct current (HVDC) bus, electric power from the unregulated DC bus; and
receiving, by the load, electric power from the regulated HVDC bus.

20. The method of claim 19, wherein
the receiving, by the first collector bus, electric power from the first plurality of electric power sources comprises receiving the electric power from at least one of a first solar array, a first battery, and a first supercapacitor; and
the receiving, by the second collector bus, electric power from the second plurality of electric power sources comprises receiving the electric power from at least one of a second solar array, a second battery, and a second supercapacitor.

* * * * *